United States Patent Office 3,681,166
Patented Aug. 1, 1972

3,681,166
HEAT SEALING OF POLYSTYRENE
Robert J. Caiola, Saginaw, and Cleown A. Leatherman, Shepherd, Mich., assignors to The Dow Chemical Company, Midland, Mich.
No Drawing. Filed Apr. 23, 1969, Ser. No. 818,788
Int. Cl. C09j 5/02
U.S. Cl. 156—308         10 Claims

ABSTRACT OF THE DISCLOSURE

Sheets of styrene polymer are sealed at temperatures lower than the heat distortion temperature of the polymer by applying to a surface of the sheet a relatively volatile liquid which is essentially insoluble in the polymer at room temperature and slightly soluble in the polymer at the temperature used to seal the sheet. By sealing sheets of styrene polymers in accordance with this method, problems which normally result from heat sealing such sheets at high temperatures are avoided.

BACKGROUND OF THE INVENTION

This invention relates to the art of sealing films and sheets of styrene polymers, and more particularly, to methods for sealing such films and sheets at temperatures below the heat distortion temperature of styrene polymers.

In the formation of useful articles from sheets or films of thermoplastic materials, particularly styrene polymers, it is often desirable to bond such sheets to each other. The bonding is usually accomplished by one of two general techniques. According to one technique an adhesive material is applied to the surfaces of the sheets to be bonded; the sheets are positioned as desired; and heat and/or pressure are applied to form a secure bond. In accordance with the second technique, the surfaces of the sheets are positioned as desired and sufficient heat and pressure are applied to melt or soften the thermoplastic material. Both of the above techniques generally require temperatures so high that the resultant seal of thermoplastic polymer has poor esthetic appeal and exhibits degraded functional properties, usually as a result of heat shrink. These problems are particularly acute in the case of oriented films or sheets of polystyrene and other styrene polymers. The technique requiring the use of adhesive suffers from the additional problems caused by the adhesive, for example, increased blocking, brittle seals and increased opacity. In other sealing techniques, liquids which are solvents for styrene polymer are used to produce film-to-film bonding. Unfortunately, such solvents usually cause cracks in the polymer (so-called crazing). At the very best, such solvents form a bond which is opaque.

In view of the problems occurring in prior techniques used for sealing styrene polymers, it would be highly desirable to provide a tractable method for economically sealing film and sheets of styrene polymers upon the application of moderate pressure and heat below that normally causing heat shrink.

SUMMARY OF THE INVENTION

In accordance with the present invention a plurality of styrene polymer sheets are sealed together to form secure, essentially transparent bonds by the method comprising the steps of (1) wetting a surface of a sheet of normally solid, styrene polymer with a moderately low boiling liquid which is essentially insoluble in the polymer at temperatures ranging from room temperature to about 50° C. and slightly soluble in the polymer at temperatures ranging from about 50° C. to about 120° C.; (2) placing the wetted surface in contact with another surface of styrene polymer sheet to form contiguous surfaces with the liquid disposed therebetween; and (3) removing the liquid while maintaining the resulting contiguous structure. Advantageously the liquid is removed by applying force to the contiguous surfaces causing them to press against each other and heating the contiguous surfaces until the liquid is removed. It is required, however, that the internal temperature of the styrene polymer not reach the heat distortion temperature of such polymers. The resultant seals are secure, essentially transparent bonds in which the properties of the polymer are not deleteriously affected. Such seals are impervious to water and air and are at least equal in strength to that of the sheets being sealed.

Sheets or films of styrene polymers treated in accordance with the method of this invention may be employed in a wide variety of uses which require a sealable transparent sheet material, for example, a box overwrap in the packaging art. The method of this invention is particularly useful in the production of packages for food, clothing and other articles for which an entirely transparent package is desirable.

DESCRIPTION OF THE PREFERRED EMBODIMENTS

The sheets of styrene polymers which are employed in the practice of this invention are well known oriented or unoriented thin, flexible sheets or films made by extruding or casting the styrene polymer in film form. The film may be oriented by one of several known techniques. For example, the film is usually biaxially oriented by further stretching (i.e., blowing) or cold drawing the film to about 50 to 300 percent of its original length along each of its two principal axes in a known manner to cause moleculuar orientation and hence improvement in both strength and clarity. Styrene polymer sheets having thicknesses ranging from about 0.3 to about 20 mils are suitably employed.

For the purposes of this invention the term styrene polymer includes polymers of the monovinylidene aromatic monomers such as styrene and substituted styrenes, e.g., $\alpha$-methylstyrene, ar-methylstyrene, ar-chlorostyrene, ar-t-butylstyrene and the like. Styrene polymers also include the copolymers of the monovinylidene aromatics with up to about 30 weight percent of other ethylenically unsaturated monomers which are known to copolymerize with monovinylidene aromatics, for example, 1,3-butadiene, acrylonitrile, ethyl acrylate, ethylene, propylene, methyl methacrylate and the like. It is further understood that such polymers may contain small amounts of crosslinking agent such as divinyl benzene. Methods for polymerization or copolymerization of monovinylidene aromatic monomers are well known in the polymerization art.

Liquids which effectively lower the temperature required to seal the styrene polymer sheets and yet which do not adversely affect the physical characteristics of styrene polymers are those which are essentially insoluble, i.e., do not appreciably solvate, in styrene polymer at temperatures from room temperature to about 50° C. As a further requirement suitable liquids are slightly soluble in styene polymer at temperatures ranging from about 50° C. to about 120° C. Desirable liquids have boiling points ranging from about 50° to about 150° C., preferably from about 65° to about 95° C.

Representative of liquids suitable employed are the aliphatic alcohols having from 1 to 5 carbon atoms; e.g., methanol, ethanol, n-propanol, iso-propanol, n-butanol, iso-butanol, n-hexanol, n-heptanol and the like; the aliphatic hydrocarbons having from 5 to 7 carbon atoms, e.g., n-pentane, neopentane, n-hexane, n-heptane, and the like; and other liquids having the aforementioned desired characteristics. Mixtures of the above liquids are also suitable. Preferred liquids are ethanol, n-propanol, iso-propanol and n-butanol.

In carrying out the method of this invention, a suitable liquid is advantageously applied to the styrene polymer sheet using any of the common coating techniques for applying liquids to polymer film. For instance, the liquid may be wicked onto the styrene polymer sheet, applied by kiss roll, hopper or the like. It is understood that only the portion of the sheet surface where sealing is to occur needs to be contacted with the liquid. It is only required that the liquid be applied in a manner such that the sheet surface is barely moistened or wetted with the liquid. However, it is generally preferred to apply the liquid to form a continuous layer covering the portion of sheet to be sealed. It is further understood that only one of two surfaces to be sealed needs to be wetted; however, both surfaces can be wetted if so desired.

Following the application of the liquid and before the liquid evaporates from the surface of the sheet, the wetted sheet is positioned in contact with another surface of syrene polymer sheet to form contiguous surfaces with the liquid disposed therebetween. The liquid is then removed from the contiguous surfaces to form a bond between the sheets which is at least as strong as the tensile strength of the styrene polymer sheet. In preferred embodiments the liquid is removed by pressing the contiguous surfaces together and heating said surfaces until the liquid is vaporized. It is required, however, that the internal temperature of the styrene polymer sheets not reach the heat distortion temperature of the polymer. Apparatus suitable for sealing in accordance with these preferred embodiments are conventional heat sealing devices which are well known in the art.

The sealing method of this invention is suitable for surface bonding two or more articles of oriented or unoriented styrene polymer material, but is particularly useful for bonding together biaxially oriented styrene polymer sheets or films.

The following examples are given to illustrate the invention and should not be construed as limiting its scope. In addition, all parts and percentages are by weight unless otherwise indicated.

Example 1

A piece of biaxially oriented polystyrene film having a thickness of 3 mils is wetted on one surface with iso-propanol. A second piece of the polystyrene film is positioned in contact with the wetted surface to form contiguous surfaces with a layer of iso-propanol disposed therebetween. The wetted surface is readily bonded to the second piece of polystyrene film with a heat sealer. Accordingly the wetted surface in contact with the second piece of polystyrene film is inserted between the upper aluminum jaw and the lower rubber jaw of the sealing mechanism. In this case only the upper jaw is heated. The jaws are brought together with a force of 40 p.s.i. at 85° C. and held for 5 seconds. The resulting seal is transparent and the film tears before the seal is broken. In addition, the film exhibits no cracks, brittleness, distortion or heat shrinkage as a result of the seal. Similar results are obtained when other alcohols such as ethanol, n-propanol, n-butanol and n-pentanol are substituted for iso-propanol used in Example 1. Also equivalent seals are obtained if the sandwich of wetted surface and second piece of polystyrene is sealed at 65° C. for 10 minutes or at 121° C. for 0.5 second.

For the purposes of comparison, several solvents such as benzene, phenol, toluene, acetone, and xylene are substituted for iso-propanol in Example 1. The resulting seals are opaque and the film in and adjacent to the seal is brittle and cracked. When water is substituted for iso-propanol in Example 1, no seal is formed at temperatures below the melting point of the polystyrene. Water is not even slightly soluble in styrene polymer at high temperatures.

Example 2

A piece of the polystyrene film of Example 1 is wetted on one surface with n-pentane. A second piece of the polystyrene film is placed in contact with the wetted surface to form contiguous surfaces having a layer of n-pentane disposed therebetween. The surfaces remain contiguous overnight at room temperature. The resulting seal is transparent and the film tears before the seal is broken. The seal has no deleterious effects on the film.

In a similar manner surfaces of polystyrene film having layers of n-hexane or n-heptane disposed therebetween are sealed with the apparatus used in Example 1 at a pressure of 40 p.s.i. and temperature of 50° C. for one second. The resulting seals are transparent and the films tear before the seals are broken. The seals have no deleterious effects on the film.

In addition to the above examples, samples of polystyrene film having thickness from 1 to 10 mils wetted in accordance with Example 1 are sealed by the application of heat and pressure facing either wetted side against wetted side or wetted side against unwetted side. One of the advantages of this invention is that the appropriate liquid needs only to be applied to one side of the sheet or film to effect sealing.

Example 3

Polystyrene film having an average thickness of 3 mils is sealed by wetting a surface of the film with methanol, placing another polystyrene film surface in contact with the wetted surface, and subjecting the contiguous surfaces to heat and pressure using the apparatus described in Example 1. Secure seals are formed at a jaw temperature of 90° C. in 2 seconds and at 100° C. in one second.

Secure seals are formed under similar conditions when ethanol is used as the liquid. In both instances, the seals are essentially transparent and the sealed film are not distorted or otherwise physically impaired.

What is claimed is:

1. A method for sealing together styrene polymer sheets without deleteriously affecting the properties of the sheets, which comprises the steps of (1) wetting a surface of a sheet of a normally solid, styrene polymer with a moderately low boiling liquid which is essentially insoluble in the polymer at temperatures ranging from room temperature to about 50° C. and slightly soluble in the polymer at temperatures ranging from about 50° to about 120° C., said liquid being selected from the group consisting of aliphatic alcohol having from 1 to 5 carbon atoms, aliphatic hydrocarbon having from 5 to 7 carbon atoms, and mixtures thereof; (2) placing the wetted surface in contact with another surface of styrene polymer sheet to form contiguous surfaces with the liquid disposed therebetween; and (3) subsequently removing the liquid while maintaining the resulting contiguous structure.

2. The method according to claim 1 wherein the liquid is removed by applying force to cause the contiguous surfaces to press against each other and heating said contiguous surfaces until the liquid is removed, with the proviso that the internal temperature of the sheets does not reach the heat distortion temperature of the polymer.

3. The method according to claim 1 wherein the liquid has a boiling point ranging from about 50° to about 150° C.

4. The method according to claim 3 wherein the liquid is an aliphatic alcohol having from 1 to 5 carbon atoms.

5. The method according to claim 3 wherein the liquid is an aliphatic hydrocarbon having from 5 to 7 carbon atoms.

6. The method according to claim 1 wherein the styrene polymer is polystyrene.

7. The method according to claim 1 wherein the liquid is ethanol.

8. The method according to claim 1 wherein the liquid is iso-propanol.

9. The method according to claim 1 wherein the liquid is n-pentane.

10. The method according to claim 1 wherein the liquid is methanol.

References Cited

UNITED STATES PATENTS 2,628,180   2/1953   Iverson _____ 156—308

REUBEN EPSTEIN, Primary Examiner